(12) United States Patent
Ganzhorn et al.

(10) Patent No.: US 8,811,594 B1
(45) Date of Patent: Aug. 19, 2014

(54) CONTACT ROUTING VISUALIZATION SYSTEM

(71) Applicant: Amazon Technologies, Inc., Reno, NV (US)

(72) Inventors: Jason Daniel Ganzhorn, Seattle, WA (US); Charles Eric Dannaker, Seattle, WA (US); Sunitha Muthireddy, Newcastle, WA (US); Adam Bordianu, Edmonds, WA (US); Asem Rustum, Renton, WA (US); Sippakorn Tansutthiwess, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/040,439

(22) Filed: Sep. 27, 2013

(51) Int. Cl.
*H04M 3/00* (2006.01)
*H04M 5/00* (2006.01)
*H04M 3/51* (2006.01)

(52) U.S. Cl.
CPC .................................. *H04M 3/5183* (2013.01)
USPC ............ 379/265.09; 379/265.01; 379/265.02; 379/309; 455/457

(58) Field of Classification Search
USPC .................. 379/265.09, 265.01, 265.02, 309; 455/457
See application file for complete search history.

(56) References Cited

U.S. PATENT DOCUMENTS

| 6,064,730 A * | 5/2000 | Ginsberg ................. 379/265.09 |
| 2013/0231142 A1* | 9/2013 | Millard et al. ................ 455/457 |

* cited by examiner

*Primary Examiner* — Quynh Nguyen
(74) *Attorney, Agent, or Firm* — Lowenstein Sandler LLP

(57) ABSTRACT

A computing device generates a plurality of visual indications of connections made between customers and service representatives by an automated dispatcher system. The computing device further provides animations of the plurality of visual indications moving on a map between customer locations associated with the customers and service representative locations associated with the service representatives.

23 Claims, 9 Drawing Sheets

CONTACT ROUTING VISUALIZATION SYSTEM

BACKGROUND

Many companies have call centers or outsource to call centers with trained professionals who help customers resolve problems associated with products and/or services provided by the companies. Customers may be dispersed throughout the world, and call centers may be located at various locations around the world. Service representatives at call centers often feel disconnected from the company and/or from the individuals that they are helping for the company.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein is a visualization system that provides visual indications of connections between customers and service representatives. An automated dispatch system may connect the customers to the service representatives. The connections may be phone connections, instant message connections and/or electronic mail (email) connections. For example, a phone connection may be established when a customer calls a help line and is connected to a service representative over the phone. An instant message (IM) connection (also referred to as a chat connection) may be established when a user requests help via a help box in a web page.

When a connection is established, the automated dispatch system may report the connection for use by a visualization system. The visualization system may generate a visual indication for the connection and present the visual indication on a map. The visual indication may move on a map along a path between the customer location and the service representative location. This visual indication may be displayed at call centers and/or individual service representative devices.

Visual indications of many connections may be shown on the map. As connections are established, each connection may have a visual indication, which may move between a customer location and a service representative location (e.g., at a service center). Additionally, connections may be transferred between service representatives. Such connection transfers may be shown using visual indications moving from a first service representative location to a second service representative location. Visual indications can indicate to service representatives an overall connection volume, where a bulk of connections are originating, how much volume each of the service centers is handling, how many connections are being transferred, and so forth. Such visualizations may help service representatives feel connected to other service representatives, to customers, and to the company for which they are fielding customer calls. People in general rely on visual input, and the visual indications provide a good way for customer representatives to understand the scale of the customer service provided by the company. By tapping into the power of visual perception, embodiments allow users to quickly gain insight into the scope and extent of the interaction between customers and service representatives tasked to help them.

Figure 1:
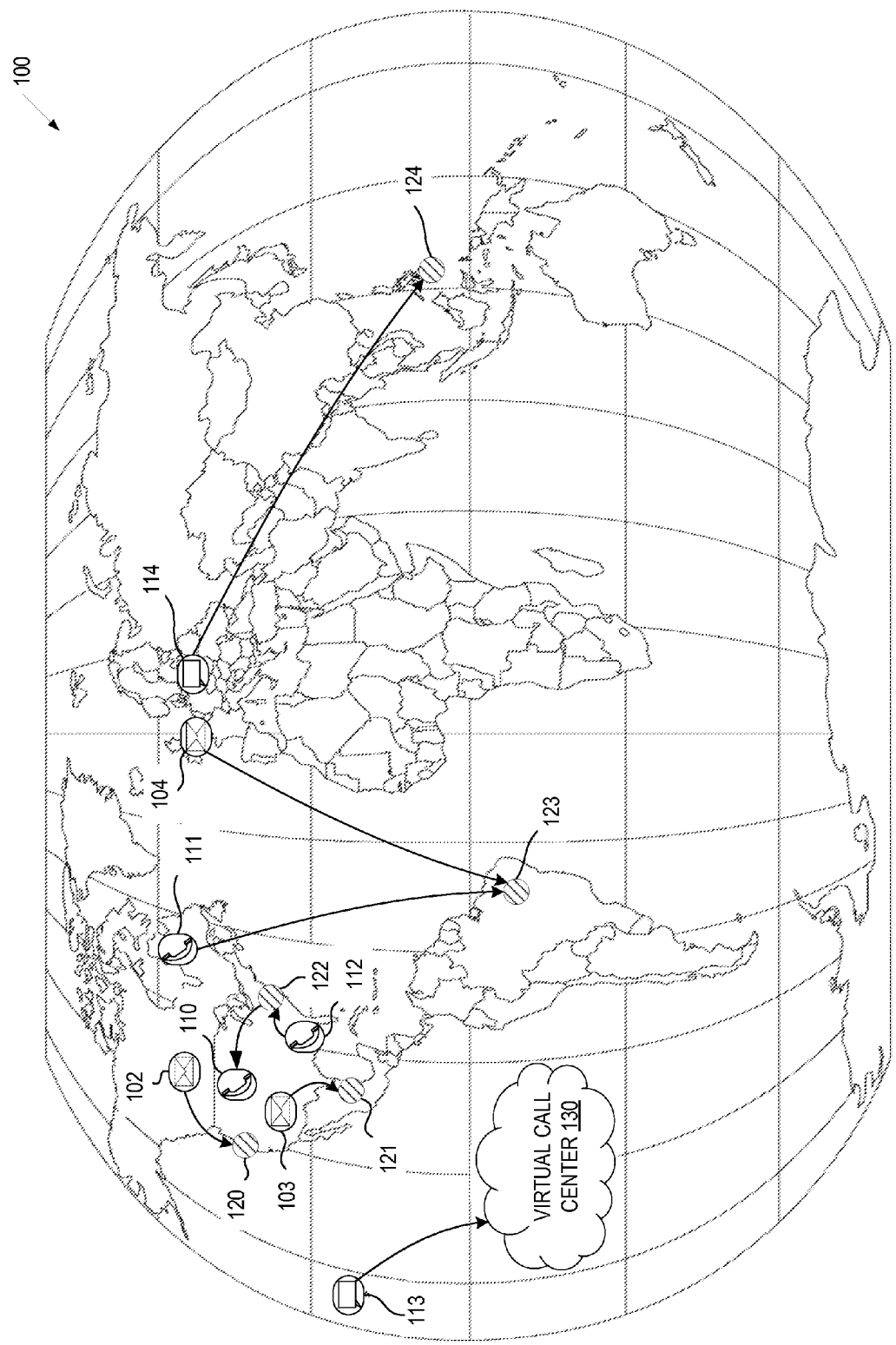
FIG. 1 illustrates a visualization of customers connecting to service representatives around the world, in accordance with one embodiment of the present invention.

FIG. 1 illustrates a visualization 100 of customers connecting to service representatives around the world, in accordance with one embodiment of the present invention. The visualization 100 may be displayed on monitors that are located at call centers and/or on displays of service representatives. Note that though the illustrated visualization 100 is a global visualization, local visualizations may also be provided instead of, or in addition to, the global visualization. For example, a zoomed in visualization of a continent, a hemisphere, a country, a state, a prefecture, or other geographic area may be shown.

The visualization 100 shows connections using visual indications that move between customer locations and service representative locations. If a connection is initiated by a customer, then the customer location is determined to be a start location and the service representative location is determined to be an end location. This may occur, for example, if a customer calls a service number, if a customer selects a help window on a web page, if a customer sends an email to a company help email address, and so on. If a connection is initiated by a service representative, then the service representative location may be determined to be the start location, and the customer location may be determined to be the end location. This may occur, for example, if a service representative has scheduled a follow-up call with the customer.

In many cases, service representatives are located at call centers, such as call centers 120, 121, 122, 123 and 124. Call center 120 is located in North America on the West Coast, call center 122 is located in North America on the East Coast, call center 121 is located in Mexico, call center 123 is located in Brazil, and call center 124 is located in the Philippines. Some service representatives may not be associated with physical call centers. In one embodiment, a virtual call center 130 is shown to represent service representatives not associated with a physical call center 120-124. In the illustrated embodiment, the virtual call center 130 is shown as floating over the Pacific Ocean. However, the virtual call center 130 may be shown anywhere on the map. Alternatively, the virtual call center 130 may be shown above, below, or to the side of the map. Note that multiple virtual call centers may also be shown in some embodiments. For example, an Americas virtual call center may be used for all service representatives located in North, Central or South America that are not associated with a physical call center. Similarly, a Pan-Asian virtual call center may be used for all service representatives located in Asia that are not associated with a physical call center.

Customers may be located worldwide. Example customers are shown in North America, Japan, and Western Europe. For customer originated connections, a visual indication may appear on the map at the location of the customer. The visual indication may then move along a path from the customer location to the service representative location, which is typically the location of a physical call center where the service representative is located. For example, a visual indication 102 is shown moving from a customer location in Canada to call center 120. Another visual indication 103 is shown moving from a customer location in the United States to call center 121. Another visual indication 113 is shown moving from a customer location in Japan to the virtual call center 130.

For service representative originated connections, a visual indication may appear on the map at a call center location associated with the service representative. The visual indication may then move along a path to a location of the customer. For example, a visual indication 110 is shown to have originated at call center 122 and moved to a customer location in the Central United States. An example of a service representative originated connection is a follow-up that has been scheduled by the service representative.

There are multiple different communication mechanisms that may be used to connect customers to service representatives. Three example communication mechanisms, referred to herein as connection types, are phone connections, email connections and IM connections. Other possible connection types are text messages (e.g., short message service (SMS) messages, multimedia messaging service (MMS) messages, etc.), a connection via a social networking account of a customer, and so on.

Each connection type may be represented in the visualization 100 using a different image or icon. For example, an image of an envelope may be used to depict email connections, an image of a phone may be used to depict phone connections, and an image of a speech bubble may be used to depict IM connections. Accordingly, visual indications 113, 114 of speech bubbles represent IM connections. Visual indications 102, 103, 104 of envelopes represent email connections. Visual indications 110, 111, 112 of phones represent phone connections.

Though not shown in visualization 100, each visual indication of a connection may also be selected based on a service category associated with that connection. For example, if a customer is requesting assistance with setting up a recent purchase of a particular product, the visual indication may be an image of that product. If a customer is requesting assistance with streaming instant video, then the visual indication may include an image of a television. Any other visual indications based on a service category are also possible.

In some embodiments, visual indications include images that reflect both the connection type and the service category. For example, a connection having a connection type of email and a service category of instant video streaming may be associated with an image that includes an envelope and a television screen. The images may be integrated in any number of ways. For example, the visual indication may include a larger image of a phone, envelope or speech bubble to indicate a connection type and a smaller image associated with the service category. In another example, the visual indication may be based on the connection type, but it may be trailed by a trail of smaller visual indications that are associated with the service category. This trail of smaller visual indications may fade over time.

In some instances, due to high connection volume, the number of visual indications shown on the map may be very large. To reduce clutter on the visualization 100, multiple connections may be aggregated and represented by a single visual indication. The scale of the number of connections represented by a single visual indication may be shown in a key on the map. The number of connections represented by a single visual indication may also be represented in the visual indication itself. For example, if a visual indication represents 5 connections, it may include an "x5" symbol in a lower or upper corner. In one embodiment, connections having shared connection type and/or service category may be aggregated. Alternatively, any connections with similar starting locations and similar ending locations may be aggregated.

Other types of visual indications may also be shown on the map. For example, night and day at different geographic areas may be depicted on the map by shading areas for which it is nighttime. Additionally, visual indications showing that call centers have reached particular volume or have met other criteria may be shown. For example, if a call center reaches 5000 calls in a day, a "+5000" visual indication may be shown and then fade over time. In another example, a visual indication of a happy face may show up above a call center that has received a threshold number of (e.g., 100) positive feedback comments from customers. Similarly, a sad face image may appear above a call center that has received a threshold number of (e.g., 10) negative feedback comments from customers. Other visual indications are also possible.

Figure 2:
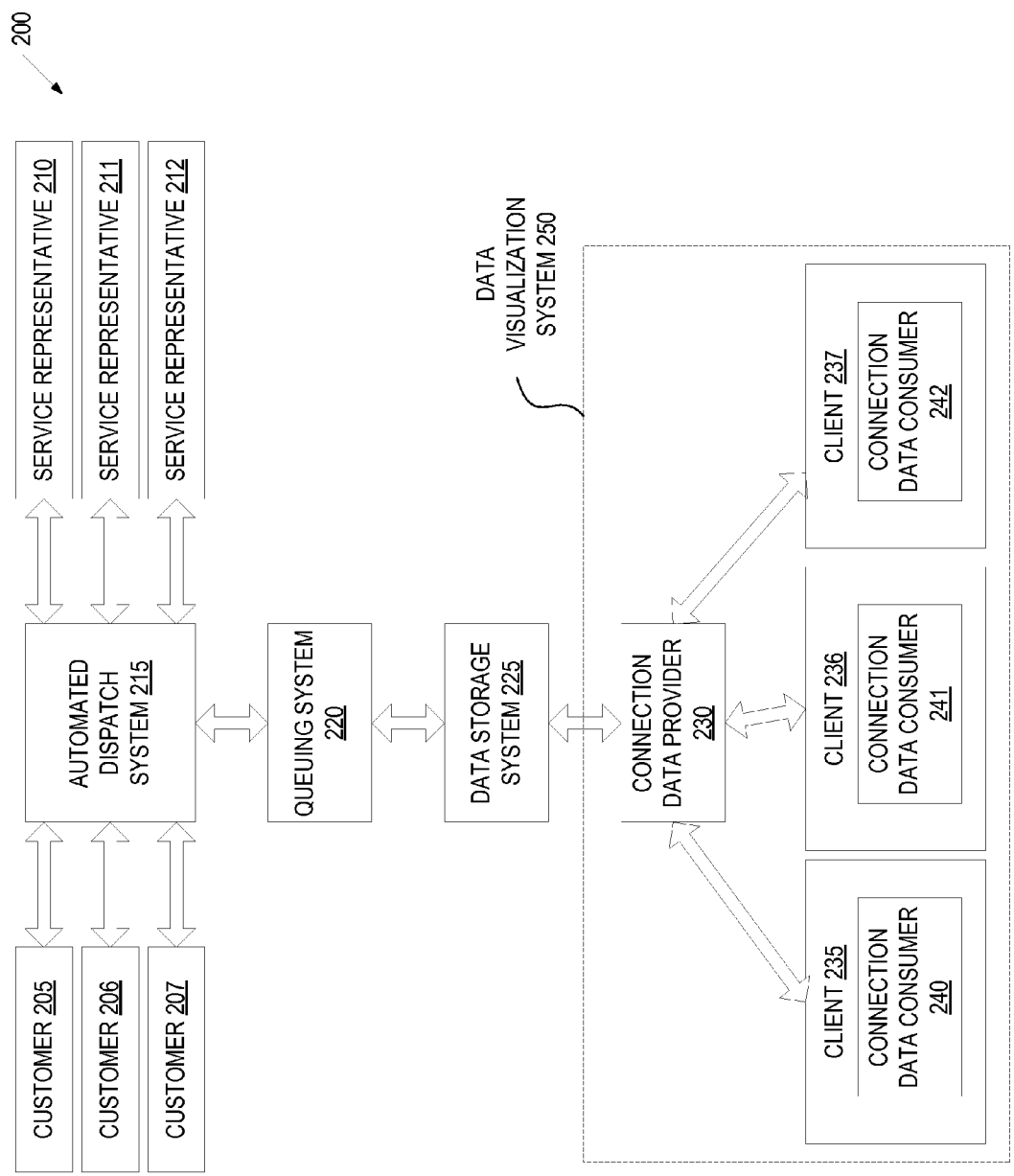
FIG. 2 is a block diagram example of a network architecture, in which embodiments of the present invention may operate.

FIG. 2 is a block diagram example of a network architecture 200, in which embodiments described herein may operate. The network architecture 200 may include an automated dispatch system 215, a queuing system 220, a data storage system 225, customers 205-207, service representatives 210-212, clients 235-237, and a data visualization system 250 including a connection data provider 230 and one or more connection data consumers 240-242. One or more of the automated dispatch system 215, queuing system 220, data storage system 225, connection data provider 230, and/or clients 235-237 may be connected via a network, which may be a public network such as the Internet, a private network such as a local area network (LAN), or a combination thereof.

The automated dispatch system 215 connects customers 205-207 to service representatives 210-212. Customers 205-207 may include customer computing devices, which may include mobile phones, laptop computers, desktop computers, tablet computers, and so forth. Customers 205-207 may connect to the automated dispatch system 215 using these customer computing devices. Additionally, customers 205-207 may include phones, which may be mobile phones or conventional landline phones. Customers 205-207 may additionally connect to the automated dispatch system 215 via their phones.

Service representatives 210-212 may include phones and/or computing devices. The phones may be mobile phones or landline phones, and the computing devices may be laptop computers, desktop computers, tablet computers, and so forth. The service representatives 210-212 may connect to the customers 205-207 via the automated dispatch system 215 using whichever communication medium is being used by a customer to which the service representative connects.

The automated dispatch system 215, queuing system 220, data storage system 225 and connection data provider 230 may each include one or more machines (e.g., one or more server computers, routers, gateways, etc.) that have processing and storage capabilities to provide server-based functionality. Each of these systems may be implemented by a single machine or a cluster of machines, each of which may include data stores and/or other data processing equipment. In one embodiment, the automated dispatch system 215, queuing system 220, data storage system 225 and/or connection data provider 230 include one or more network based servers, which may be hosted, for example, by network based hosting services such as Amazon's® Elastic Compute Cloud® (EC2).

The automated dispatch system 215 manages the routing and establishing of connections between the customers 205-207 and the service representatives 210-212. When a new contact to a customer is posted, the contact may be associated with a particular service category. The service category may have been selected by a customer 205-207, or may be determined by the automated dispatch system based on information already known about the customer and/or based on information received from the customer. For example, a customer may indicate that they are having a particular problem. For phone calls, the customer may select their problem from a voice menu. For IM connections, the customer may select their problem from a dropdown menu prior to or during establishment of an IM session. Alternatively, the customer may speak their problem into the phone, or may type their problem into a text box. In response, automated dispatch system 215 may use a natural language processing engine to determine a service category based what the customer said or typed. The natural language processing engine may also be used to parse the contents of customer email messages to determine a service category.

In one embodiment, automated dispatch system 215 includes a machine learning engine that predicts a service category for a customer based on information on hand about the customer. The information may include recent activity of the customer (e.g., on the company's web site), a purchase history of the customer with the company, demographic information about the customer, and so on. The machine learning engine may work in combination with the natural language processor to determine a service category.

Examples of service categories include online transaction, order management, electronic products, digital content, and so on. Any number of service categories may be used, and the service categories may be based on the services and/or products of a particular company.

Different service representatives 210-212 may be associated with different service categories. For example, service representative 210 may be trained to handle customer inquiries regarding online transactions, service representative 211 may be trained to handle customer inquiries regarding digital content, and service representative 212 may be trained to handle customer inquiries regarding order management. Each of these service representatives 210-212 may be associated with the same or a different call center. In one embodiment, particular call centers are associated with particular service categories. For example, service representatives at a particular call center may be trained to handle customer inquiries regarding movie streaming or other digital content.

Automated dispatch system 215 may connect customers to service representatives that are trained to handle the particular issues that the customers are facing. For example, if customer 205 indicated that he is having a problem with playing a streamed movie, then automated dispatch system 215 may route a connection for that customer 205 to service representative 210, which may be trained to handle digital content issues.

In one embodiment, automated dispatch system 215 performs load balancing for connections. Automated dispatch system may include information on capacities of different call centers to handle different types of customer issues. Such information may indicate capacities of these call centers over time. For example, capacities of some call centers may increase during the week and decrease on the weekend, or may increase at certain hours and decrease at certain hours. Automated dispatch system 215 may include rules that indicate how to route connections to call centers. Such rules may take into account the capacities of the call centers at any given time. In an example, a load balancing rule may specify that 30% of digital content issues are to be routed to a first call center between 3:00 GMT and 12:00 Greenwich Mean Time (GMT), and that 70% of digital content issues are to be routed to a second call center between 3:00 GMT and 12:00 GMT. This load balancing rule may be based, for example, on information indicating that at these times the second call center has over twice the capacity of the first call center.

The automated dispatch system 215 may additionally include a priority queue. Automated dispatch system 215 may route a customer 205-207 to a particular call center, where that customer will be connected to a first available service representative of the particular call center who is trained to handle the problem that the customer is having. However, if no service representative from that call center connects to the customer within a predetermined time period (e.g., 30 seconds from when the customer initiated contact), then automated dispatch system 215 may add that customer to the priority queue. Once a customer is in the priority queue, any service representative worldwide trained for the service category at issue may respond to the customer, regardless of the call center with which the service representative is associated.

When a connection is established between a customer 205-207 and a service representative 210-212, the automated dispatch system 215 reports the connection to a queuing system 220. The report may indicate a customer location, a service representative location (e.g., a call center identifier), a connection type (e.g., a phone connection, an email connection, or an IM connection), a time stamp indicating when the connection was established, and/or a service category. Additionally, when a connection to a customer is transferred between two different service representatives, this connection transfer may be reported to the queuing system 220. The connection transfer may include a transferor service representative location, a transferee service representative location, a connection type, a time stamp, and/or a service category.

The queuing system 220 receives connection data (including connection transfer data) from the automated dispatch system 215, and places the connection data for the connections into a queue. Queuing system 220 may use a publish-subscribe mechanism that the automated dispatch system 215 publishes connection data to. In one embodiment, queuing system 220 is an instance of the Amazon® Simple Queue Service (Amazon SQS). Alternatively, the queuing system 220 may be an instance of Java® Message Service (JMS), a Really Simple Syndication (RSS) feed, an Atom Syndication Format feed, or any other system that takes a data source and queues it up for consumption. Each entry added to the queue may be for a particular connection and may include the customer location, the service representative location, a time stamp, a connection type and/or a service category.

The data storage system 225 de-queues entries from the queue, and stores data from the entries into a data store. The data store may be a database, a file system, or other data storage system. In one embodiment, the data storage system 225 stores data in a relational database, and includes a database management system for interfacing with and managing the relational database. A relational database provides for constrained queries and grouping, which may enable aspects such as zooming and filtering. The data may be stored using Amazon's Simple Storage Service (S3), may be stored in a Dynamo database, in a MySQL database, in a NoSQL data store, or in another type of data store.

In one embodiment, automated dispatch system 215 publishes data at a particular frequency. The queuing system 220 may be configured to check the for connection data at the particular frequency.

The data storage system 225 may receive queries for data from the data visualization system 230. Such queries may include parameters such as a time range, a service representative location, a customer location, and so on. The data storage system 225 may retrieve data from the data store matching the parameters in the query, and may provide this data to the visualization system 230.

The data storage system 225 may permanently store the connection data. Accordingly, the connection data may be presented in near real time (as the connections are established minus some lag time). Additionally, historical connection data may be presented over any time range for which data is stored. For example, data for connections over a historical time period may be retrieved from the data store, and may be used to perform a temporal replay over the time period. In the temporal replay a second of real time may represent a day, a week, or other time period. The speed of the replay may be adjusted to speed it up or slow it down.

Connection data provider 230 retrieves the connection data from the data store by interacting with data storage system 225. Connection data provider 230 may then transmit the connection data to connection data consumers 240-242 running on clients 235-237. Connection data consumers 240-242 generate visual indications based on the connection data. Alternatively, connection data provider 230 may generate the visual indications and provide them to the clients 235-237. Connection data consumers 240-241 may provide a global map or a map of another geographic area. For example, connection data consumers 240-241 may provide a zoomed in map of a region including a call center, or a region from which a high volume of customer connections are originating. The visual indications may be shown on the map.

Each client 235-237 may login to the connection data provider 230. Responsive to a client logging in to the connection data provider 230, a new data visualization instance may be loaded. Different data visualization instances associated with different connection data consumers 240-242 may show the same visualization or different visualizations. Each connection data consumer instance may query the connection data provider 230, receive connection data, and generate a visualization of the connections.

Figure 3:
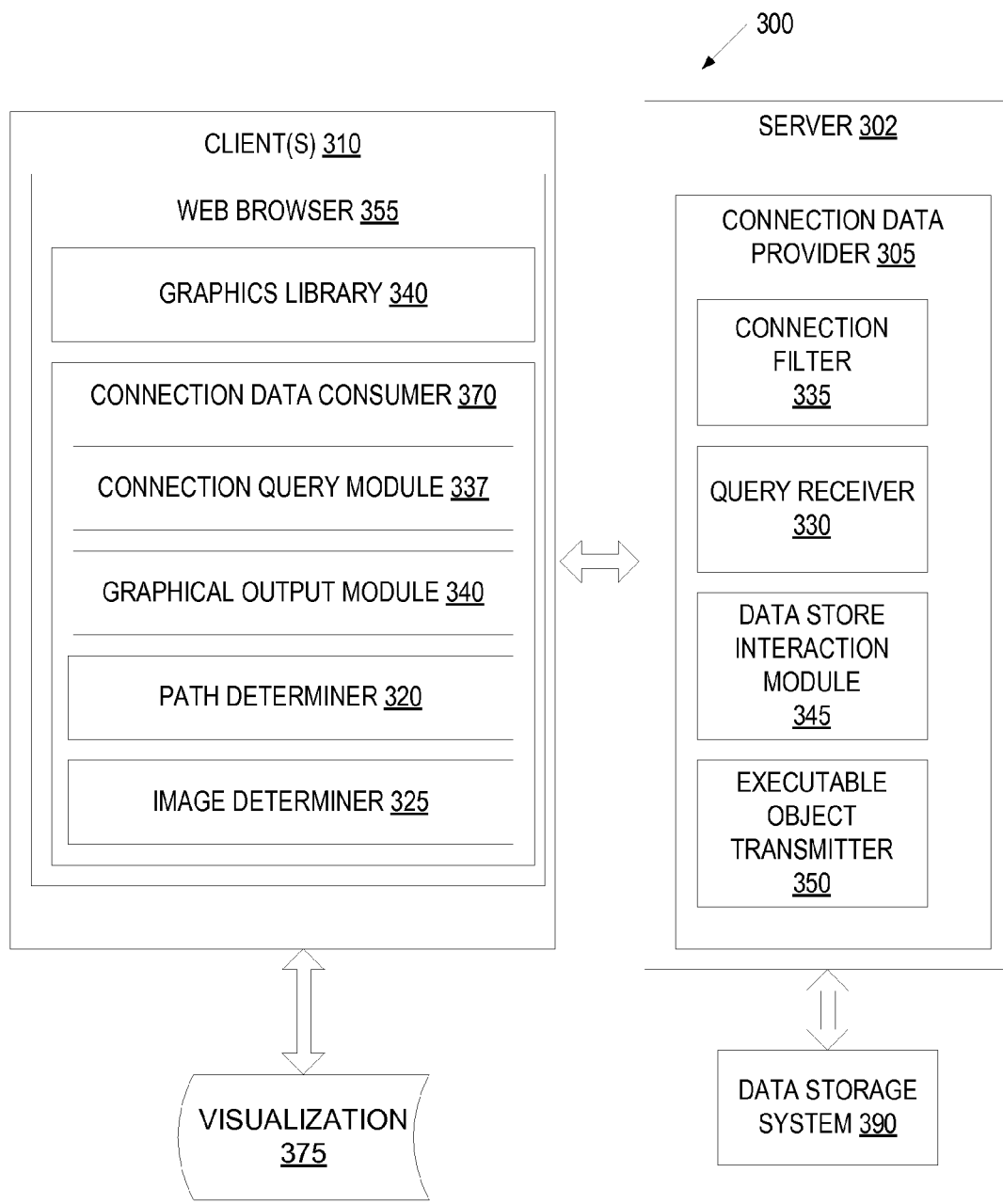
FIG. 3 is a block diagram of one embodiment of a data visualization system.

FIG. 3 is a block diagram of one embodiment of a data visualization system 300. In one embodiment, data visualization system 300 includes one or more connection data consumers 370 that run on clients 310 and a connection data provider 305 that runs on a server 302. Clients 310 and server 302 may be computing devices such as desktop computers; laptop computers, rack mount server machines, mobile phones, and so forth. Each instance of a connection data consumer 370 may include a path determiner 320, a connection query module 337, an image determiner 325 and a graphical output module 340. The connection data provider 305 may include a query receiver 330, a connection filter 335, a data store interaction module 345, and an executable object transmitter 350.

Clients 310, 311 may connect to the connection data provider 305 by navigating to a particular web site using applications such as web browsers 355 running on the clients 310, 311. Alternatively, clients 310, 311 may include other client applications that connect to the connection data provider 305. Some clients 310-311 include applications that are associated with the visualization service provided by connection data provider 305. Examples of client machines that may use such applications ("apps") include mobile phones, "smart" televisions, tablet computers, and so forth. The applications or apps may access content provided by data visualization system 305, issue commands to connection data provider 305, receive content from connection data provider 305, and so on without visiting web pages associated with connection data provider 305. For example, a so called smart television may include an application "app" that is configured to log into and interact with the connection data provider 305 to provide visualizations of connections.

Responsive to a web browser 355 navigating to a web page associated with the connection data provider 305, executable object transmitter 350 transmits one or more executable objects 370, 371 and/or additional data to the web browser 355. The executable objects may be Javascript objects, Asynchronous Javascipt and XML (AJAX) objects, or other executable objects that enable asynchronous communication between the web browser 355 and the connection data provider 305. In one embodiment, the downloaded executable objects include connection data consumer 370 and graphics library 340. If a client includes an application that is configured to interact with the connection data provider 305, that application may log into the connection data provider 305 to start a session. For such applications, no executable objects would typically be downloaded to the client.

Connection data consumer 370 or applications include a connection query module 337 that sends queries to connection data provider 305 for updates to connection data. A sent query may include a time range. A sent query may additionally include filter criteria, a call center identification, a time stamp, and/or other information.

Query receiver 330 on connection data provider 305 receives a query, and data store interaction module 345 initiates an additional query to the data storage system 390. The query to the data storage system 390 may include the time range, time stamp, filter parameters, or other data received from the connection data consumer 370. Examples of filter parameters include customer location, service representative location, or other criteria. For example, client 310 may be associated with a particular call center, and may ask for connections that are associated with that call center. Additionally, or alternatively, connection filter 335 may add additional filter parameters to the query issued to the data storage system. In an example, connection filter 335 may add filter parameters for queries associated with a particular client 310, 311 based on an origin of a received query. For example, if the client 310 is associated with an outsourcer, then connection data associated with connections to other call centers may be filtered out. The data storage system 390 may respond to the query with connection data for connections established in the time range that match the filter parameters. The received connection data may include customer location, service representative location, connection type, time stamp, service category, and/or additional information. Query receiver 330 may then respond to the query from the connection data consumer 370 with the connection data for the connections established in the time range that match the filter parameters.

For each connection, path determiner 320 may determine a start location and an end location based on the customer location and the service representative location. The data for a connection may additionally indicate whether the connection was initiated by the service representative or by the customer. This data may additionally be used to determine the start and end location. Once the start and end location are determined, the path determiner computes a path between the start location and the end location. Additionally, the path determiner 320 may determine start and end locations for connection transfers between service representatives, and may compute a path between these start and end locations.

Image determiner 325 determines visual indications to use for depicting connections and/or connection transfers. A visual indication may be selected based on a service category, a connection type, and/or other information (e.g., information indicating a connection transfer). For example, a phone image may be selected for connections with a phone call connection type, an envelope image may be selected for connections with an email connection type, and an image of a speech bubble may be selected for a connection with an IM connection type. Similarly, different images may be chosen based on different service categories.

Graphical output module 340 outputs the visual indication for connections and/or connection transfers to a particular visualization 375. The visualization 375 is then displayed by the web browser 355 or other application using graphics library 340. Graphics library 340 may be a Javascript library for rendering graphics within web browser 355.

In one embodiment, queries are made by the connection query module 337 to the visualization data provider 305 on a first periodic basis (e.g., every 5 seconds). Similarly, data store interaction module 345 may query data storage system 390 on a second periodic basis (e.g., every 5 seconds). The first periodic basis may be the same as or different from the second periodic basis.

The visualization 375 may be updated on the periodic basis, so that all of the connections that were established in the past time period (e.g., the past 5 seconds) show up at once. Alternatively, graphical output module 340 may provide the visual indications of connections in the visualization 375 over a time period based on time stamps associated with the connections. Thus, the visualization 375 may display animations of visual indications moving along paths between customer locations and service representative locations over time with a particular time lag. These visual indications may appear to be happening live.

In one embodiment, connection data provider 305 caches connection data. Alternatively, or additionally, the data storage system 390 may cache connection data. Cached connection data may include connection data for a past 10 seconds or other time period for example. Accordingly, if a query is received, query receiver 330 may determine whether connection data for a time range (or a portion of a time range) included in the query is cached. If connection data is cached, then data store interaction module 345 may not query the data storage system for connection data covering the time range for which connection data is cached. Alternatively, if the data storage system caches recent connection data and/or responses to recent queries then data storage system 390 may respond to queries from cached data rather than retrieving the data from the data store.

In one embodiment, graphical output module 340 generates visual indications of unconnected customers as well as visual indications of connections between customers and service representatives and connection transfers between different service representatives. When data store interaction module 345 queries data storage system 390, it may additionally query for unconnected customers, which may be sent to visualization data consumer 370. Path determiner 320 may determine a path from an unconnected customer to an intermediate location (e.g., a position over a nearby ocean). Additionally, image determiner 325 may determine an appropriate image for the unconnected customer based on a connection type and/or service category associated with the unconnected customer. Graphical output module 340 may generate visual indications of the unconnected customers hovering over a determined intermediate location.

As updated connection data is received (e.g., based on updated queries to the data storage system 390), connections will be established for unconnected customers. Connection data consumer 370 may determine that an unconnected customer is associated with a particular connection, and may show a visual indication for the previously unconnected customer moving from the intermediate location to an end location (e.g., of the service representative). Alternatively, connection data consumer 370 may not link unconnected customers to later connections. In such an implementation, graphical output module 340 may decrement a number of unconnected customers shown in the intermediate location for each newly established connection.

In one embodiment, graphical output module 340 uses graphics library 340, which may be a scalable vector graphics (SVG) animation library such as Raphael, to render and animate images. In one embodiment, a new technique that is not supported by Raphael is used to show transparency gradients. Transparency gradients in one embodiment include two end stops and an intermediate stop. Transparency may transition from 100% at a first end stop to a particular percentage an intermediate stop, and may transition from the particular percentage at the intermediate stop to 0% at the second end stop. For example, a radial gradient may transition from 100% at a radial center to 80% at a halfway point, and may transition from 80% to 0% between the halfway point and the outside of the radius.

FIGS. 4-8 are flow diagrams of various implementations of methods related to providing visual indications of connections between customers and service representatives. The methods are performed by processing logic that may include hardware (circuitry, dedicated logic, etc.), software (such as is run on a general purpose computer system or a dedicated machine), or a combination of both. In one implementation, the methods may be performed by data visualization system 305 of FIG. 3. Some operations and/or methods may be performed by connection data consumer 370, while other operations and/or methods may be performed by connection data provider 305 of FIG. 3.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 4:
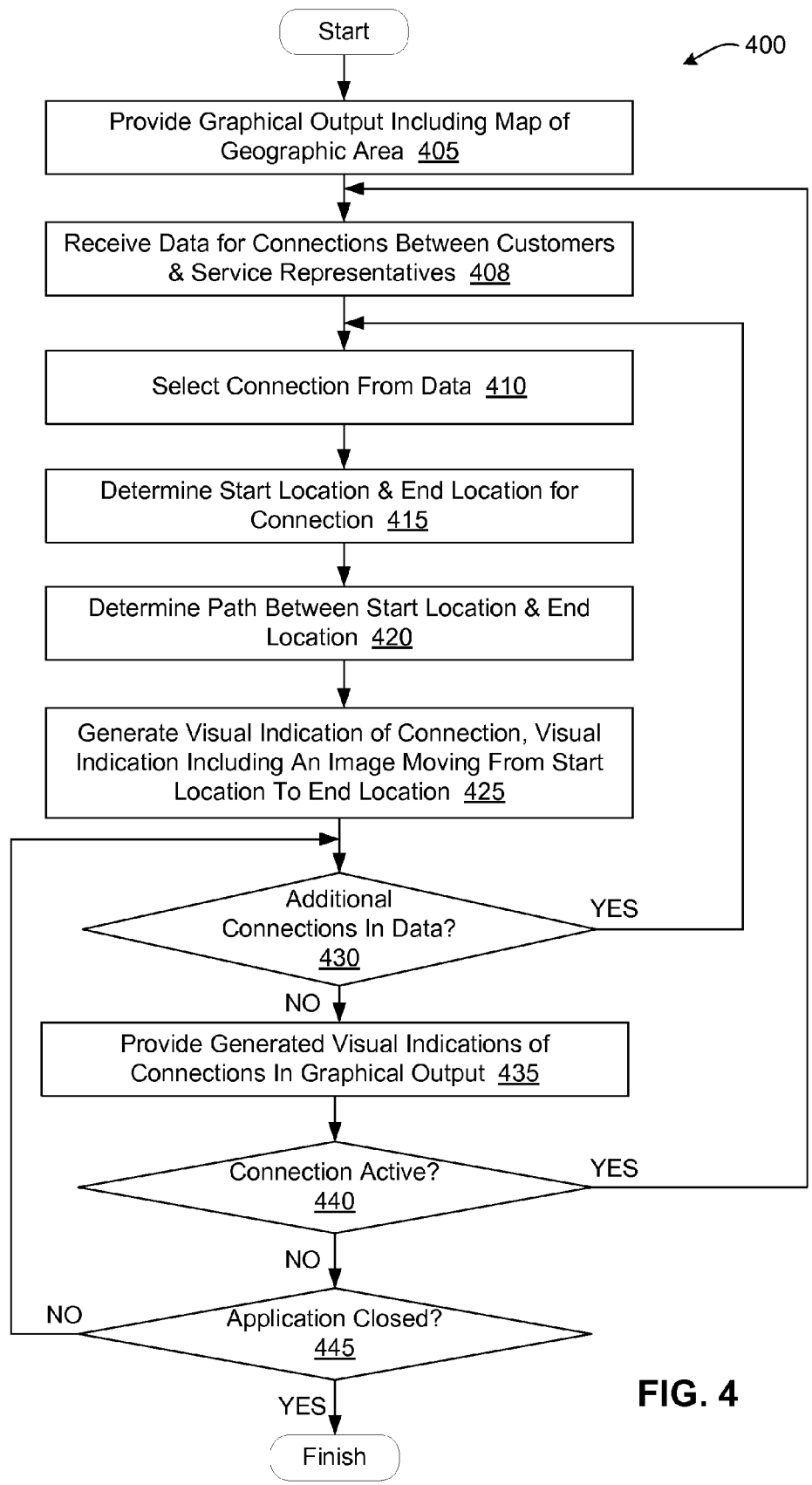
FIG. 4 is a flow diagram of one embodiment for a method of providing a graphical output showing customers connecting to service representatives.

FIG. 4 is a flow diagram illustrating one embodiment for a method 400 of providing a graphical output showing customers connecting to service representatives. In one embodiment, method 400 is performed by a visualization data consumer running on a client. In another embodiment, method 400 is performed by a visualization data provider running on a server.

At block 405 of method 400, processing logic provides a graphical output including a map of a geographic area. At block 408, processing logic receives data for connections between customers and service representatives. Additionally, processing logic may receive data for connection transfers between service representatives. The data may include a collection of entries, where each entry includes multiple different fields. Some fields that may be included in the entries include a customer location field, a service representative location field, a time stamp field, a connection type field, a service category field, and so on.

At block 410, processing logic selects a connection from the data for processing. In one embodiment, the connections are selected in a chronological order, so that an oldest connection entry is processed first. At block 415, processing logic determines a start location and an end location for the selected connection. This determination may be made based upon a customer location, service representative location, and/or information indicating whether the customer or service representative initiated the connection. At block 420, processing logic determines a path between the start location and the end location. The path may be computed to be a direct or straight path, or may be an arced path, or have another path shape. A path for a current connection may be determined based on the paths of one or more previous connections with similar starting and/or ending locations in addition to the starting and ending location for the current connection.

At block 425, processing logic generates a visual indication of the connection (or of the connection transfer). The visual indication may include an image moving from the start location to the end location. The image may be an animated image that changes over time, or may be a fixed or static image that moves, but that does not otherwise change over time.

At block 430, processing logic determines whether there are additional connections in the data for which visual indications have not been generated. If so, the method returns to block 410. If visual indications have been created for all connections in the data, the method proceeds to block 435, and the visual indications of the connections are provided in the graphical output.

At block 440, processing logic determines whether a connection to a provider of the connection data is still active. If the connection is still active, the method returns to block 408, and new connection data is received. The new connection data may be received responsive to sending a new query to the provider (e.g., to a visualization data provider). If the connection is not active, the method continues to block 445, and processing logic determines whether an application or process that generates connection data visualizations is closed. If the application or process is still open, the method returns to block 430. If the application or process has closed or ended, the method ends. For example, the method may end if a web browser tab or window to a web site that provides the connection data is closed.

Figure 5:
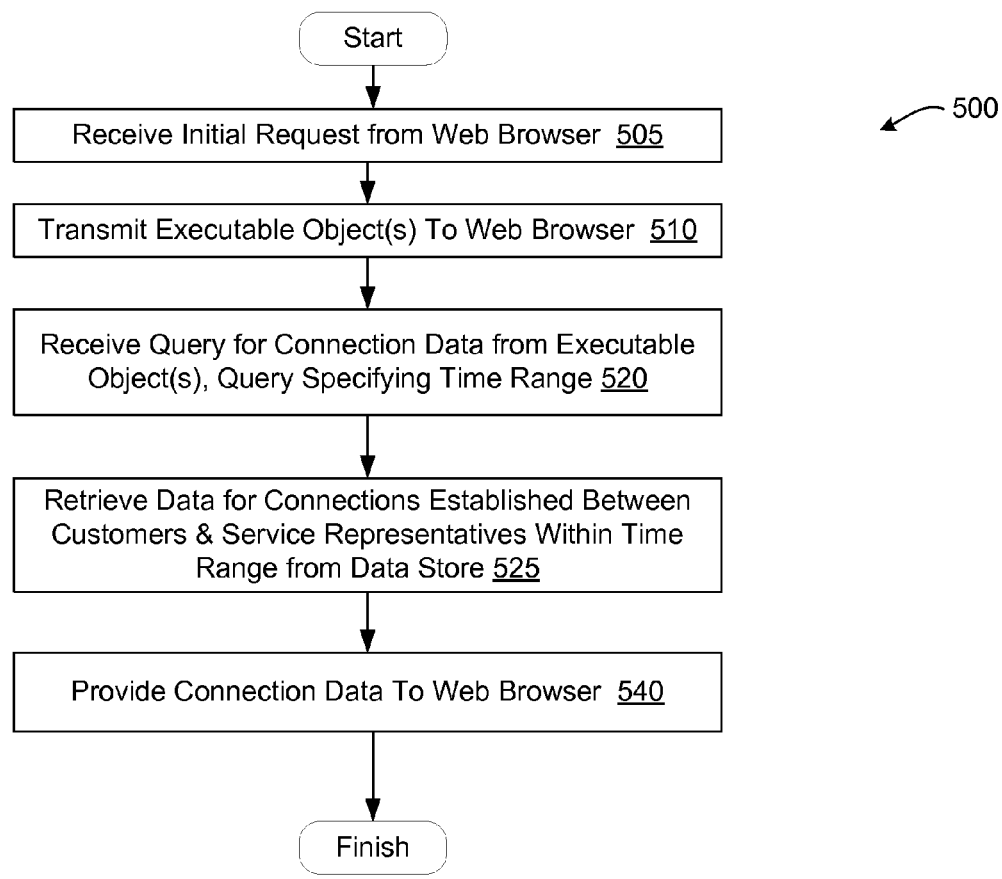
FIG. 5 is a flow diagram of one embodiment for a method of providing connection data to a client.

FIG. 5 a flow diagram of one embodiment for a method 500 of providing connection data to a client. In one embodiment, method 500 is performed by connection data provider 305 of FIG. 3. At block 505 of method 500, processing logic receives an initial request from a web browser. The web browser may login to a web site that provides a visualization of connections, and may issue the request responsive to logging in.

At block 510, processing logic transmits one or more executable objects to the web browser. The executable objects may include Javascript objects, AJAX objects and/or other executable objects. The executable objects may include, for example, a connection data consumer and a graphics library.

At block 520, processing logic receives a query for connection data from the executable object. The query may specify a time range. At block 525, processing logic retrieves data for connections established within the time range from a data store. At block 540, processing logic then provides the connection data to the executable object executing on the web browser.

Figure 6:
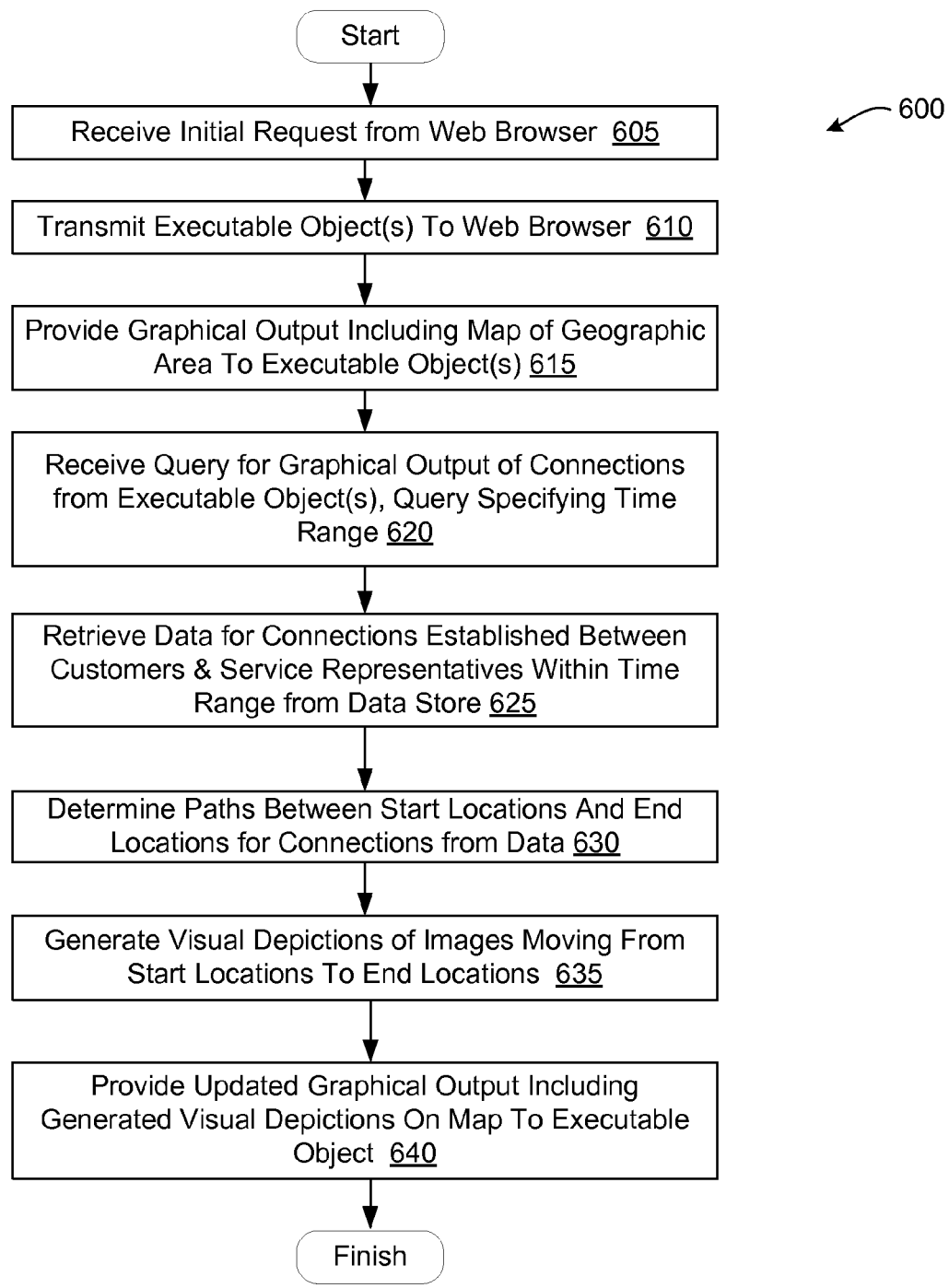
FIG. 6 is a flow diagram of another embodiment for a method of providing a graphical output showing customers connecting to service representatives.

FIG. 6 a flow diagram of another embodiment for a method 600 of providing a graphical output showing customers connecting to service representatives. In one embodiment, method 600 is performed by connection data provider 305 of FIG. 3. At block 605 of method 600, processing logic receives an initial request from a web browser. The web browser may login to a web site that provides a visualization of connections, and may issue the request responsive to logging in.

At block 610, processing logic transmits one or more executable objects to the web browser. The executable objects may include Javascript objects, AJAX objects and/or other executable objects. At block 615, processing logic provides a graphical output including a map of a geographic area to the executable objects.

At block 620, processing logic receives a query for graphical output of connections from the executable object. The query may specify a time range. At block 625, processing logic retrieves data for connections established within the time range from a data store. At block 630, processing logic determines paths between start locations and end locations for connections from the retrieved data. At block 635, processing logic generates visual depictions of images moving from the start locations to the end locations. At block 640, processing logic then provides an updated graphical output to the executable object executing on the web browser. The updated graphical output may include the generated visual depictions on the map.

Figure 7:
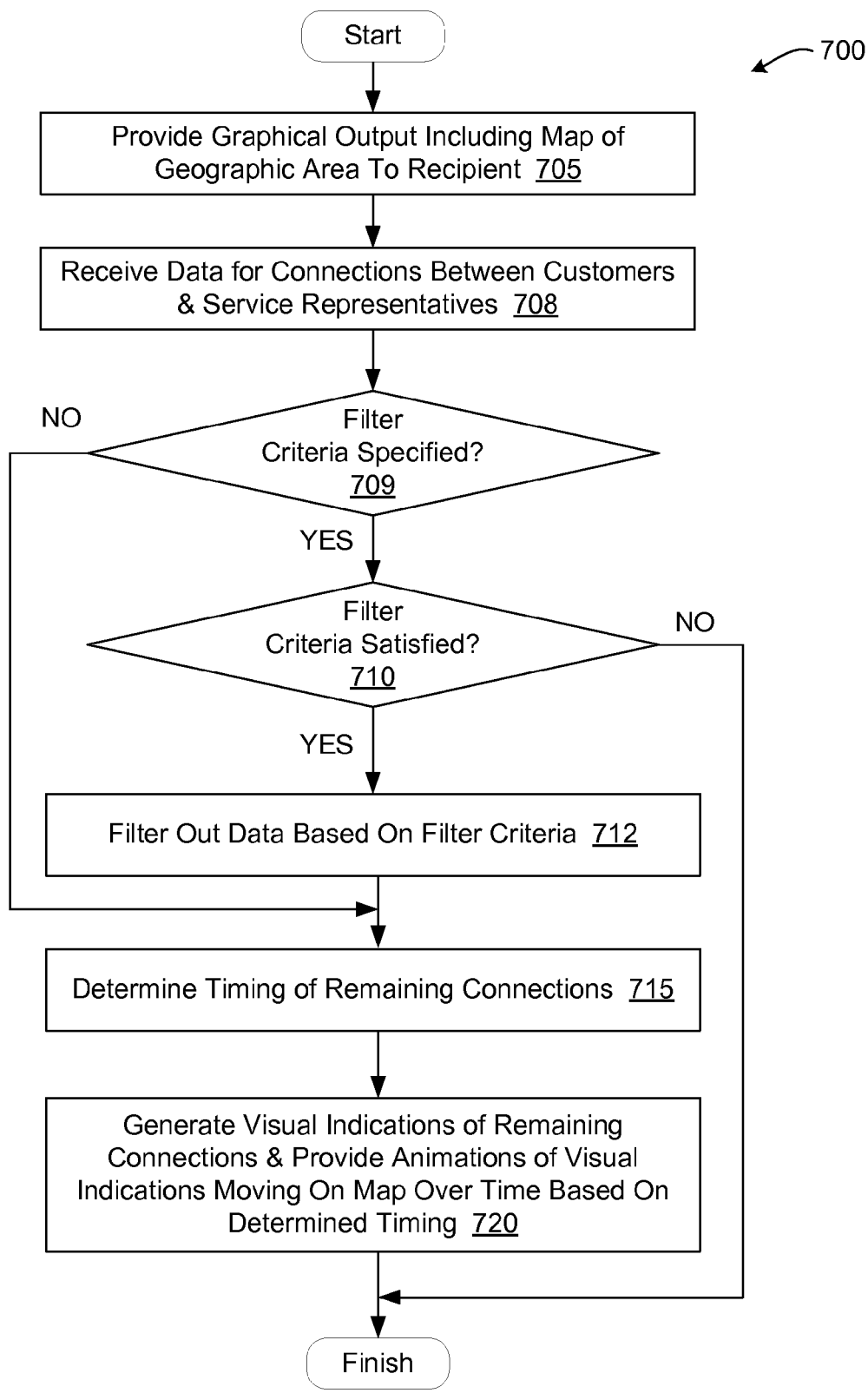
FIG. 7 is a flow diagram of yet another embodiment for a method of providing a graphical output showing customers connecting to service representatives.

FIG. 7 is a flow diagram of yet another embodiment for a method 700 of providing a graphical output showing customers connecting to service representatives. At block 705 of method 700, processing logic provides a graphical output including a map of a geographic area. At block 708, processing logic receives data for connections between customers and service representatives. At block 709, processing logic determines whether any filter criteria have been specified. If filter criteria have been specified, the method continues to block 710. Otherwise, the method proceeds to block 715.

At block 710, processing logic determines whether one or more filter criteria are satisfied. One example of a filter criterion is a call center criterion that will filter out all connections not associated with a particular call center. Accordingly, the filter criterion may be satisfied for connections associated with that particular call center. Another example of a filter criterion is a customer location criterion that will filter out all connections with customers outside of a geographic area. For example, if a visualization is a zoomed in visualization of a country, state, or city, then all connections with customers that are not within the borders of a displayed map may be filtered out. Another example of a filter criterion is a service category criterion that may filter out connections that fail to match a particular service category. Another example of a filter criterion is a connection type criterion that will filter out connections that are not associated with a particular connection type. If a filter criterion is satisfied (e.g., there is data that will not be filtered out based on the filter criterion), the method continues to block 712 and connection data is filtered out in accordance with the matched filter criteria. If no filter criteria are satisfied (there is no data to be filtered out), the method proceeds to block 718 and all data is filtered out.

At block 715, processing logic determines a timing of remaining connections that have not been filtered out. At block 720, processing logic generates visual indications of the remaining connections. Processing logic may then provide animations of the visual indications moving on the map over time based on the determined timing. The visual indications may be shown with a particular time lag. For example, visual indications may be shown 5 seconds or 10 seconds behind real time.

Figure 8:
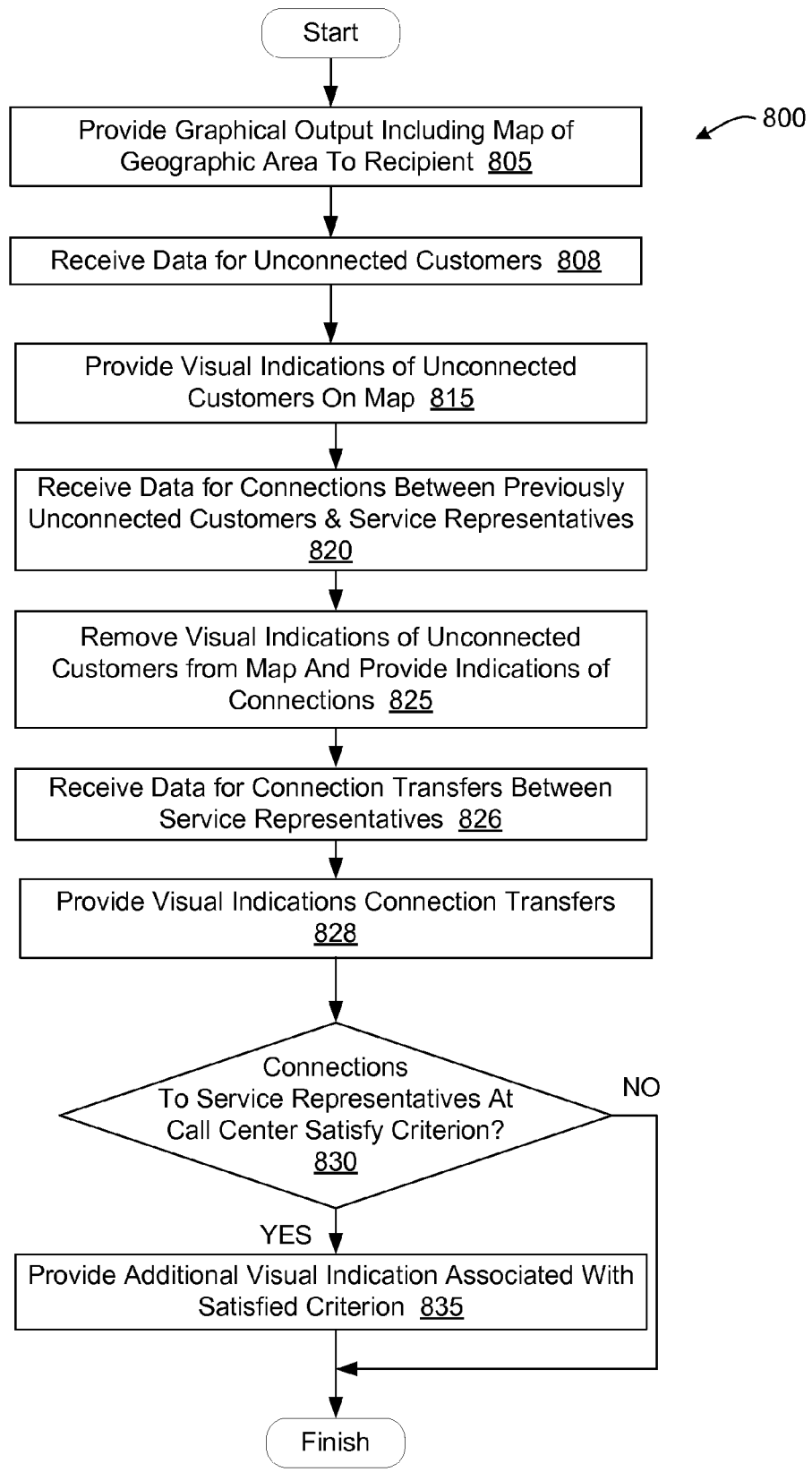
FIG. 8 is a flow diagram of still another embodiment for a method of providing a graphical output showing customers connecting to service representatives.

FIG. 8 is a flow diagram of still another embodiment for a method 800 of providing a graphical output showing customers connecting to service representatives. At block 805 of method 800, processing logic provides a graphical output including a map of a geographic area to a recipient. At block 808, processing logic receives data for unconnected customers. At block 815, processing logic provides visual indications of the unconnected customers on the map. In one embodiment, the visual indications are images shown to float over a particular region or regions on the map.

At block 820, processing logic receives data for connections between the previously unconnected customers and service representatives. Processing logic may additionally receive updated data on new unconnected customers. At block 825, processing logic removes visual indications of the previously unconnected customers that have established connections from that map. Processing logic additionally provides visual indications of the connections of the previously unconnected customers to service representatives.

At block 826, processing logic receives data for connection transfers between service representatives. At block 828, processing logic provides visual indications of the connection transfers. A visual indication of a connection transfer may include an image that travels along a path between a transferor service representative and a transferee service representative. A different image may be used for connection transfers than for connections between customers and service representatives.

At block 830, processing logic determines whether connections to service representatives associated with a particular call center satisfy a visualization criterion. If so, the method continues to block 835, and an additional visualization associated with the satisfied criterion is shown. For example, a visualization criterion may be a threshold of 5000 connections in a day. If a service center reaches 5000 connections in a day, then a visual indication of "+5000" may be provided on the map. If no additional visualization criteria are satisfied, the method ends.

Figure 9:
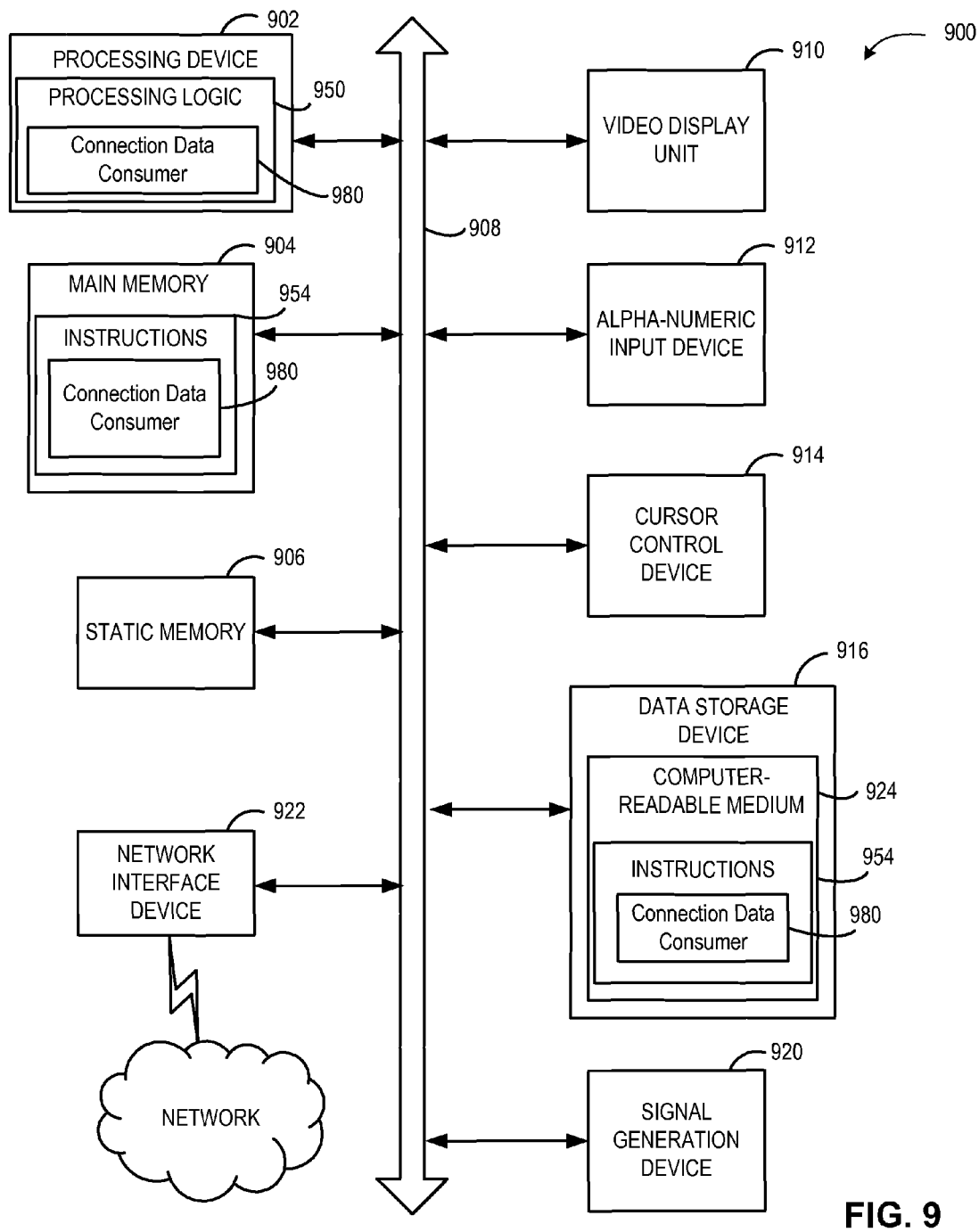
FIG. 9 is a block diagram of an example computing device, which may perform operations in accordance with embodiments of the present invention.

FIG. 9 is a block diagram of an example computing device 900, which may perform operations in accordance with embodiments of the present invention. A set of instructions for causing the computing device 900 to perform any one or more of the methodologies discussed herein may be executed by the computing device 900. The computing device 900 may correspond to a computing device of server 302 or clients 310 of FIG. 3 and/or to a computing device of any of customers 205-207, automated dispatch system 215, service representatives 210-212, queuing system 220, data storage system 225, connection data provider 230 and clients 235-237 of FIG. 2.

In embodiments of the present invention, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The exemplary computing device 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 916, which communicate with each other via a bus 908.

The processing device 902 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 902 may therefore include multiple processors. The processing device 902 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computing device 900 may further include a network interface device 922. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable storage medium 924 on which is stored one or more sets of instructions 954 embodying any one or more of the methodologies or functions described herein (e.g., for a connection data consumer 980 that provides a visualization of connections between customers and service representatives). The instructions 954 may also reside, completely or at least partially, within the main memory 904 and/or within the processing device 902 during execution thereof by the computer system 900; the main memory 904 and the processing device 902 also constituting machine-readable storage media.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the computing device that cause the computing device to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "providing", "receiving", "transmitting", "querying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   providing, by a processing device, a graphical output comprising a map of a geographic area;
   receiving, by the processing device, data for a plurality of connections between customers and service representatives, the data for a connection of the plurality of connections comprising a customer location of a customer who requested assistance, a service representative location of a service representative that connected with the customer to provide the requested assistance and a connection type associated with the connection; and
   for the connection of the plurality of connections, performing the following by the processing device comprising:
      determining a start location and an end location based on the customer location and the service representative location of the connection;
      determining a path between the start location and the end location; and
      providing a visual indication of the connection in the graphical output, the visual indication comprising an image moving on the map of the geographic area from the start location to the end location along the determined path, wherein the image is selected based on the connection type.

2. The method of claim 1, further comprising:
   querying a data store or server on a periodic basis to receive the data representing the plurality of connections, wherein the data is added to the data store from a queuing service that queues the connections as they occur, and wherein a query comprises a time range, the plurality of connections having been established within the time range.

3. The method of claim 1, further comprising performing the following for each connection of the plurality of connections:
   identifying a time stamp indicating when the connection was established; and
   determining a time at which to present the visual indication of the connection based on the time stamp, wherein visual indications for the plurality of connections are provided over time based on their time stamps, the visual indications lagging behind real time by a time lag.

4. The method of claim 1, wherein the processing device executes a web browser, the method further comprising:
   sending an initial request to a server by the web browser;
   receiving, from the server, one or more objects executable by the web browser;
   generating a query for the data by the one or more objects, the query specifying a time range;
   receiving the data from the server, the plurality of connections in the data having been established within the time range; and
   generating the graphical output, the graphical output comprising visual indications of the plurality of connections established within the time range.

5. A non-transitory computer readable storage medium comprising instructions that, when executed by a processing device, cause the processing device to perform operations comprising:
   providing, by the processing device, a graphical output comprising a map of a geographic area;
   receiving, by the processing device, data for a plurality of connections between customers and service representatives, the data for a connection of the plurality of connections comprising a first field indicating a customer location, a second field indicating a service representative location and third field indicating a connection type associated with the connection;

determining a start location and an end location for the connection of the plurality of connections based on the customer location and the service representative location; and providing a visual indication for the connection of the plurality of connections in the graphical output, the visual indication comprising an image moving on the map of the geographic area from the start location to the end location, wherein the image is selected based at least in part on the connection type.

6. The non-transitory computer readable storage medium of claim 5, wherein the connection type comprises one of a phone connection, an instant message connection or an electronic mail connection, and wherein the image comprises a first image if the connection type is a phone connection, the image comprises a second image if the connection type is an instant message connection, and the image comprises a third image if the connection type is an electronic mail connection.

7. The non-transitory computer readable storage medium of claim 5, wherein the data for the connection further comprises a service category, and wherein the image is selected based on the service category.

8. The non-transitory computer readable storage medium of claim 5, the operations further comprising:

querying a data store on a periodic basis to receive the data representing the plurality of connections, wherein the data is added to the data store from a queuing service that queues the connections as they occur, and wherein a query to the data store comprises a time range, the plurality of connections having been established within the time range.

9. The non-transitory computer readable storage medium of claim 8, the operations further comprising performing the following for each connection of the plurality of connections:

identifying a time stamp indicating when the connection was established; and determining a time at which to present the visual indication of the connection based on the time stamp, wherein visual indications for the plurality of connections are provided over time based on their time stamps, the visual indications lagging behind real time by a time lag.

10. The non-transitory computer readable storage medium of claim 5, the operations further comprising:

receiving a request for the graphical output from a web browser of a client machine;

transmitting to the web browser one or more objects executable by the web browser;

receiving a query from the one or more objects, the query specifying a time range;

retrieving the data from a data store, the plurality of connections in the data having been established within the time range; and providing the graphical output to the web browser, the graphical output comprising visual indications of the plurality of connections established within the time range.

11. The non-transitory computer readable storage medium of claim 5, the operations further comprising:

providing an additional visualization of a virtual call center on the map; and for a connection to a service representative not associated with a physical call center, performing the following comprising:

determining the start location and the end location based on the customer location and a location on the map of the additional visualization of the virtual call center.

12. The non-transitory computer readable storage medium of claim 5, the operations further comprising:

determining whether a number of connections made to service representatives at a particular service center within a time period exceeds a threshold; and providing an additional visual indication on the map that the threshold has been exceeded.

13. The non-transitory computer readable storage medium of claim 5, the operations further comprising:

filtering out a subset of the connections for a recipient based on a filter criterion, the filter criterion comprising at least one of service representative location, service category or customer location, wherein the filtered out subset of the connections are not provided to the recipient.

14. The non-transitory computer readable storage medium of claim 5, the operations further comprising:

receiving additional data for a plurality of unconnected customers who have not been connected to service representatives;

providing visualizations of the plurality of unconnected customers in the graphical output; and removing one or more of the visualizations of the plurality of unconnected customers as connections for the plurality of unconnected customers are established with the service representatives.

15. The non-transitory computer readable storage medium of claim 5, further comprising:

receiving data for a connection transfer between a first service representative and a second service representative; and providing an additional visual indication for the connection transfer in the graphical output, the visual indication comprising an image moving on the map of the geographic area from a first location associated with the first service representative to a second location associated with the second service representative.

16. A computing device comprising:

a memory; and a processing device coupled to the memory, the processing device to:

receive data for a plurality of connections between customers and service representatives, the data for a connection of the plurality of connections comprising a customer location, a service representative location and a connection type associated with the connection;

generate visual indications of the plurality of connections made between the customers and the service representatives, the visual indication for the connection of the plurality of connections comprising an image selected based on the connection type; and provide animations of the visual indications moving on a map, wherein an animation of the visual indication for the connection of the plurality of connections moves between the customer locations and the service representative locations.

17. The computing device of claim 16, wherein the connection type comprises one of a phone connection, an instant message connection or an electronic mail connection.

18. The computing device of claim 16, wherein the processing device is further to:
provide an additional visual indication of a virtual call center at a location on the map; and
for a connection to a service representative not associated with a physical call center, determine the service representative location based on the location on the map of the additional visual indication of the virtual call center.

19. The computing device of claim 16, wherein the processing device is further to:
determine whether a supplemental visualization criterion is satisfied; and
provide an additional visual indication on the map responsive to a determination that the supplemental visualization criterion is satisfied.

20. The computing device of claim 16, wherein the processing device is further to:
filter out a subset of the plurality of connections for a recipient based on a filter criterion, the filter criterion comprising at least one of service representative location, service category or customer location, wherein the filtered out subset of the plurality of connections are not provided to the recipient.

21. The computing device of claim 16, wherein the processing device is further to:
query a data store or server on a periodic basis; and
responsive to the query, receive the data for the plurality of connections between the customers and the service representatives.

22. The computing device of claim 21, wherein the processing device is further to:
identify time stamps indicating when each of the plurality of connections was established; and
determine times at which to provide the animations of the visual indications based on the time stamps, wherein the animations are provided over time based on their time stamps, the visual indications lagging behind real time by a time lag.

23. The computing device of claim 16, wherein the processing device is further to:
receive data for a plurality of unconnected customers who have not been connected to service representatives;
provide visualizations of the plurality of unconnected customers on the map; and
remove one or more of the visualizations of the plurality of unconnected customers as connections for the plurality of unconnected customers are established with the service representatives.

* * * * *